United States Patent
Shao et al.

(10) Patent No.: US 12,216,482 B2
(45) Date of Patent: Feb. 4, 2025

(54) METHODS AND SMART GAS INTERNET OF THINGS SYSTEMS FOR AUTOMATIC CONTROL OF INDUSTRIAL GAS FLOWS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/587,956

(22) Filed: Feb. 27, 2024

(65) Prior Publication Data

US 2024/0201710 A1    Jun. 20, 2024

(30) Foreign Application Priority Data

Jan. 24, 2024 (CN) .......................... 202410095957.2

(51) Int. Cl.
*G05D 7/06*    (2006.01)
*G16Y 10/35*    (2020.01)

(52) U.S. Cl.
CPC ............ *G05D 7/0623* (2013.01); *G16Y 10/35* (2020.01)

(58) Field of Classification Search
CPC ....... G05D 7/0623; G16Y 10/35; Y02P 90/02; G05B 19/0423; G05B 2219/25257
See application file for complete search history.

(56) References Cited

U.S. PATENT DOCUMENTS

2010/0198417 A1    8/2010   Deivasigamani et al.
2014/0229022 A1*   8/2014   Deivasigamani ... F24D 19/1051
                                                                                                                  700/282

(Continued)

FOREIGN PATENT DOCUMENTS

CN      101614724 A      12/2009
CN      102818371 A      12/2012

(Continued)

OTHER PUBLICATIONS

Zhongfeng Wang, "Water heater heating method and system" (ip.com machine translation of application CN11366912A), Nov. 19, 2021, ip.com machine translation (Year: 2021).*

(Continued)

*Primary Examiner* — Christopher W Carter
(74) *Attorney, Agent, or Firm* — METIS IP LLC

(57) ABSTRACT

Example embodiments of the present disclosure provide a method and a smart gas Internet of Things (IOT) system for automatic control of an industrial gas flow. The method may include: obtaining a water valve adjustment history record of an industrial user who uses a hot water supply device; determining a target temperature data table for the industrial user based on the water valve adjustment history record; obtaining current water valve data of the hot water supply device in response to determining that the industrial user uses the hot water supply device; and determining a gas flow parameter based on the current water valve data and the target temperature data table. The smart gas IoT system may include a smart gas user platform, a smart gas service platform, a smart gas device management platform, a smart gas sensing network platform, and a smart gas object platform.

17 Claims, 7 Drawing Sheets

(56) References Cited

U.S. PATENT DOCUMENTS

| | | | |
|---|---|---|---|
| 2019/0024908 A1* | 1/2019 | Chaudhry | F24H 15/395 |
| 2020/0132312 A1* | 4/2020 | Hasegawa | F24H 15/486 |
| 2023/0316425 A1 | 10/2023 | Mahammad | |

FOREIGN PATENT DOCUMENTS

| | | | |
|---|---|---|---|
| CN | 103092229 A | 5/2013 | |
| CN | 103571557 A | 2/2014 | |
| CN | 105444425 A | 3/2016 | |
| CN | 105485927 A | 4/2016 | |
| CN | 113139711 A | 7/2021 | |
| CN | 216384329 U | 4/2022 | |
| CN | 114484883 A | 5/2022 | |
| CN | 115511665 A | 12/2022 | |
| CN | 117167656 A | 12/2023 | |
| JP | 2003194404 A | 7/2003 | |
| KR | 20090049464 A | 5/2009 | |

OTHER PUBLICATIONS

First Office Action in Chinese Application No. 202410095957.2 mailed on Feb. 28, 2024, 12 pages.

\* cited by examiner

METHODS AND SMART GAS INTERNET OF THINGS SYSTEMS FOR AUTOMATIC CONTROL OF INDUSTRIAL GAS FLOWS

CROSS-REFERENCE TO RELATED APPLICATIONS

This application claims priority to Chinese Patent Application No. 202410095957.2, filed on Jan. 24, 2024, the entire contents of which are hereby incorporated by reference.

TECHNICAL FIELD

The present disclosure relates to the field of control of a gas flow, and in particular, to a method and a smart gas Internet of Things (IOT) system for automatic control of an industrial gas flow.

BACKGROUND

Many industries, such as food, pharmaceutical, chemical, textile, and metal industries, currently require use of an industrial hot water system when conducting production. In a process of using industrial hot water, these industries may face challenges such as high energy costs, temperature instability, difficulty in meeting short-term fluctuations in demand in a timely manner, or the like. A traditional gas water heater achieves a constant temperature by remotely controlling a temperature setpoint. However, in addition to temperature adjustment, controlling energy costs is also a factor that should be taken into account, especially for the industrial hot water system.

Therefore, it is desirable to provide a method for automatic control of an industrial gas flow that ensures temperature instability while saving energy and minimizing energy waste.

SUMMARY

One or more embodiments of the present disclosure provide a method for automatic control of an industrial gas flow. The method may be executed by a smart gas device management platform of a smart gas Internet of Things (IOT) system, and the method may include obtaining a water valve adjustment history record of an industrial user who uses a hot water supply device and determining a target temperature data table for the industrial user based on the water valve adjustment history record, wherein the target temperature data table includes at least one water valve scale and at least one target temperature range corresponding to the at least one water valve scale. The method may further include obtaining current water valve data of the hot water supply device in response to determining that the industrial user uses the hot water supply device and determining a gas flow parameter based on the current water valve data and the target temperature data table, wherein the gas flow parameter includes an adjustment sequence of the industrial gas flow.

One or more embodiments of the present disclosure provide a smart gas Internet of Things (IOT) system for automatic control of an industrial gas flow. The smart gas IoT system may include a smart gas user platform, a smart gas service platform, a smart gas device management platform, a smart gas sensing network platform, and a smart gas object platform. The smart gas device management platform may include a smart gas indoor device parameter management sub-platform, a smart gas pipeline network device parameter management sub-platform, and a smart gas data center. The smart gas sensing network platform may include a smart gas indoor device sensing network sub-platform and a smart gas pipeline network device sensing network sub-platform. The smart gas object platform may include a smart gas indoor device object sub-platform and a smart gas pipeline network device object sub-platform. The smart gas indoor device parameter management sub-platform may be configured to obtain a water valve adjustment history record of an industrial user who uses a hot water supply device and the water valve adjustment history record is stored in the smart gas data center. The smart gas indoor device parameter management sub-platform may be configured to determine a target temperature data table for the industrial user based on the water valve adjustment history record, wherein the target temperature data table is stored in the smart gas data center and the target temperature data table may include at least one water valve scale and at least one target temperature range corresponding to the at least one water valve scale. The smart gas indoor device parameter management sub-platform may be configured to obtain current water valve data of the hot water supply device in response to determining that the industrial user uses the hot water supply device, and the current water valve data is stored in the smart gas data center. The smart gas pipeline network device parameter management sub-platform may be configured to determine a gas flow parameter based on the current water valve data and the target temperature data table stored in the smart gas data center and send the gas flow parameter to the smart gas pipeline network device object sub-platform via the smart gas pipeline network device sensing network sub-platform, wherein the gas flow parameter may include an adjustment sequence of the industrial gas flow.

BRIEF DESCRIPTION OF THE DRAWINGS

The present disclosure will be further illustrated by way of exemplary embodiments, which will be described in detail with reference to the accompanying drawings. These embodiments are not limiting, and in these embodiments, the same numbering denotes the same structure, wherein.

DETAILED DESCRIPTION

Figure 1:
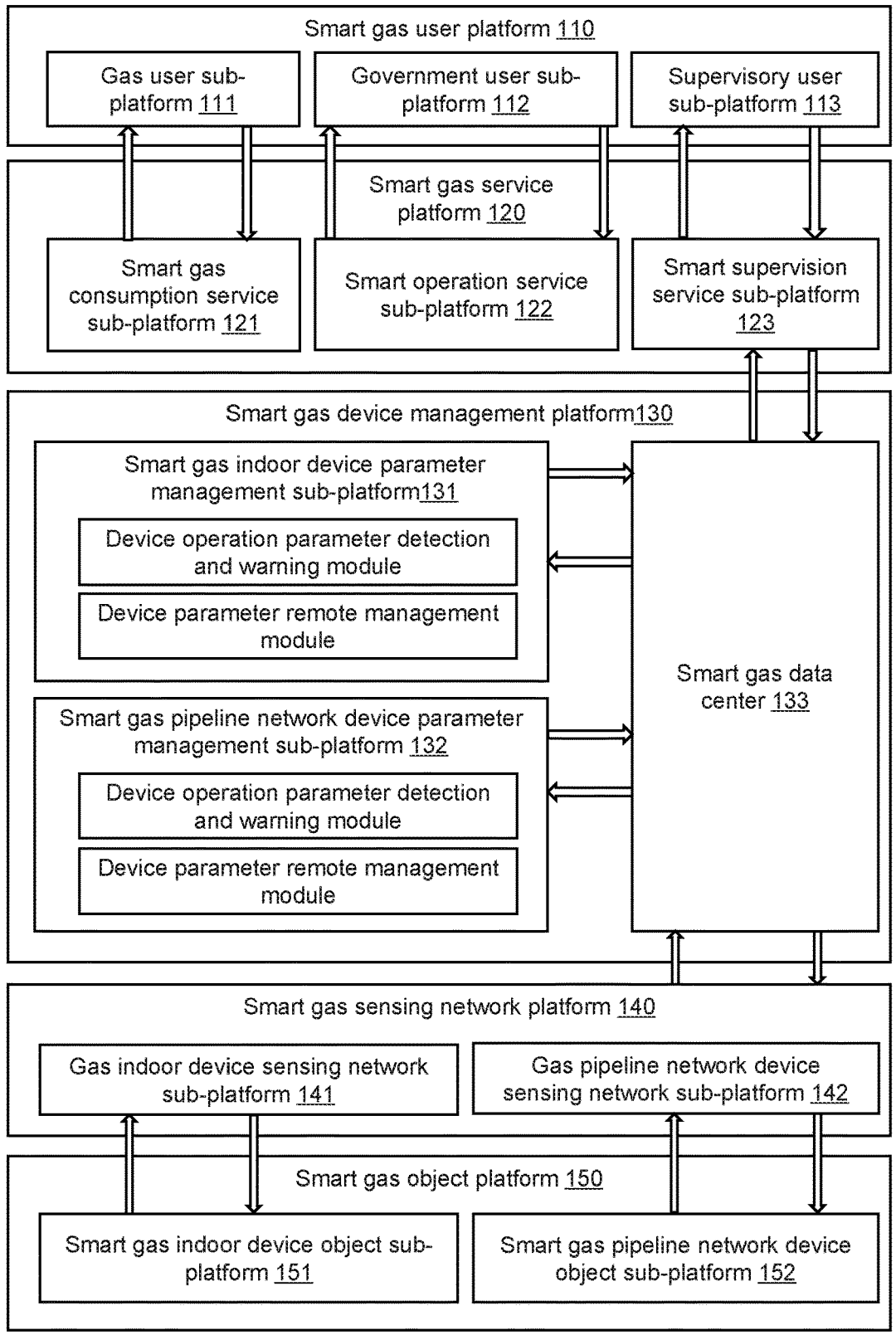
FIG. 1 is a schematic diagram of a structure of a smart gas Internet of Things (IoT) system for automatic control of an industrial gas flow according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

FIG. 1 is a schematic diagram of a structure of a smart gas Internet of Things (IoT) system for automatic control of an industrial gas flow according to some embodiments of the present disclosure.

As shown in FIG. 1, a smart gas IoT system 100 for automatic control of an industrial gas flow includes a smart gas user platform 110, a smart gas service platform 120, a smart gas device management platform 130, a smart gas sensing network platform 140, and a smart gas object platform 150.

The smart gas user platform 110 is a platform for interacting with a user. In some embodiments, the smart gas user platform 110 may be configured as a terminal device. In some embodiments, the smart gas user platform 110 may include a gas user sub-platform 111, a government user sub-platform 112, and a supervisory user sub-platform 113.

The smart gas service platform 120 is a platform for communicating the user's demand and control information. The smart gas service platform 120 may obtain information or the like from the smart gas device management platform 130 (e.g., a smart gas data center 133) and send the information to the smart gas user platform 110. In some embodiments, the smart gas service platform 120 may include a smart gas consumption service sub-platform 121, a smart operation service sub-platform 122, and a smart supervision service sub-platform 123.

The smart gas device management platform 130 is a platform that coordinates and harmonizes connections and collaborations among various functional platforms, aggregates all information of the smart gas IoT system 100, and provides perception management and control management functions for an operation of the smart gas IoT system 100. In some embodiments, the smart gas device management platform 130 may include a smart gas indoor device parameter management sub-platform 131, a smart gas pipeline network device parameter management sub-platform 132, and the smart gas data center 133.

The smart gas indoor device parameter management sub-platform 131 may be configured to obtain a water valve adjustment history record of an industrial user who uses a hot water supply device and the water valve adjustment history record may be stored in the smart gas data center 133. In some embodiments, the smart gas indoor device parameter management sub-platform 131 may be configured to, in response to determining that the industrial user uses the hot water supply device, obtain current water valve data of the hot water supply device, and the current water valve data may be stored in the smart gas data center 133.

The smart gas indoor device parameter management sub-platform 131 may be configured to determine, based on the water valve adjustment history record, a target temperature data table for the industrial user. The target temperature data table may be stored in the smart gas data center 133. The target temperature data table may include at least one water valve scale and at least one target temperature range corresponding to the at least one water valve scale. The smart gas pipeline network device parameter management sub-platform 132 may be configured to determine a gas flow parameter based on the current water valve data and the target temperature data table, and send the gas flow parameter to a smart gas pipeline network device object sub-platform 152 via a smart gas pipeline network device sensing network sub-platform 142. The gas flow parameter may include an adjustment sequence of the industrial gas flow.

The smart gas sensing network platform 140 is a functional platform that manages sensing communications. In some embodiments, the smart gas sensing network platform 140 may include a gas indoor device sensing network sub-platform 141 and the gas pipeline network device sensing network sub-platform 142, which may be configured to obtain operation information of an indoor device and a gas pipeline network device, respectively.

The smart gas object platform 150 is a functional platform for sensing information generation and controlling information execution. In some embodiments, the smart gas object platform 150 may include a smart gas indoor device object sub-platform 151 and the smart gas pipeline network device object sub-platform 152. The smart gas pipeline network device object sub-platform 152 may be configured to adjust the industrial gas flow based on the gas flow parameter.

In some embodiments of the present disclosure, based on the smart gas IoT system 100 for automatic control of the industrial gas flow, a closed loop of information operation may be formed between the smart gas object platform 150 and the smart gas user platform 110, and a coordinated and regulated operation can be achieved under unified management of the smart gas device management platform, realizing automatic control of the industrial gas flow in a smart and information-based manner.

In some embodiments, the smart gas indoor device parameter management sub-platform 132 may be configured to determine the at least one target temperature range based on the water valve adjustment history record, and further determine the target temperature data table. In some embodiments, the smart gas pipeline network device parameter management sub-platform 132 may be configured to merge the at least one target temperature range and dynamically update the at least one target temperature range. More descriptions regarding the target temperature data table and the at least one target temperature range may be found in FIGS. 3 to 5 and the related descriptions thereof.

In some embodiments, the smart gas pipeline network device parameter management sub-platform 132 may determine the gas flow parameter and a temperature rise demand based on the current water valve data and the target temperature data table. More descriptions regarding the gas flow parameter and the temperature rise demand may be found in FIGS. 6 and 7 and the related descriptions thereof.

The above descriptions of the smart gas IoT system and the platforms thereof for automatic control of the industrial gas flow is only for descriptive convenience, and do not limit the present disclosure to the scope of the cited embodiments. It is to be understood that for a person skilled in the art, after understanding principles of the smart gas IoT system, it may be possible to arbitrarily combine individual platforms or constitute a subsystem to connect with other platforms without departing from these principles.

Figure 2:
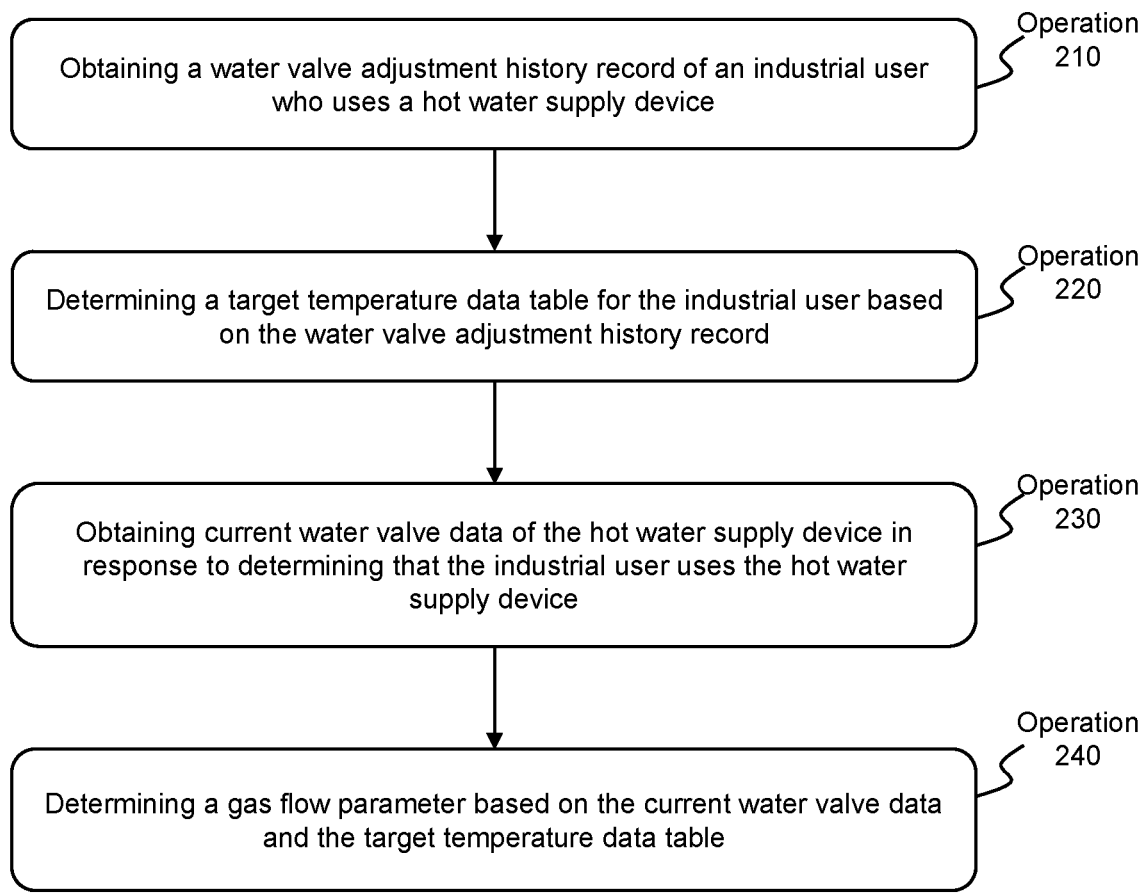
FIG. 2 is a flowchart of an exemplary process for automatic control of an industrial gas flow according to some embodiments of the present disclosure.

FIG. 2 is a flowchart of an exemplary process for automatic control of an industrial gas flow according to some embodiments of the present disclosure. As shown in FIG. 2, process 200 includes the following operations 210-240. In some embodiments, process 200 may be performed by the smart gas device management platform 130 of the smart gas IoT system 100.

In 210, obtaining a water valve adjustment history record of an industrial user who uses a hot water supply device.

The industrial user is a business that utilizes gas as an energy source for a hot water supply device and engages in industrial production and business activities.

The hot water supply device is a device used to provide hot water required by the industrial user. For example, the hot water supply device may include a volumetric gas-fired boiler, a gas-fired direct-heat boiler, or the like.

The water valve adjustment history record is historical data related to use of a hot water supply device by the industrial user. For example, the water valve adjustment history record may include a record of a stopping scale of a water valve, an adjustment amplitude, and a change in water temperature each time the water valve is adjusted by the industrial user who uses the hot water supply device during a historical time period.

In some embodiments, the smart gas indoor device parameter management sub-platform 131 may be configured to obtain the water valve adjustment history record stored in the smart gas data center 133. In some embodiments, the smart gas indoor device parameter management sub-platform 131 may be configured to obtain the stopping scale and the adjustment amplitude of the water valve from a rotary encoder of the smart gas object platform 150. The rotary encoder may be installed on the water valve, and the stopping scale and the adjustment amplitude of the water valve may be determined by reading a rotation angle of the water valve. The rotary encoder is a sensor that is used to measure a rotational motion of the water valve.

In some embodiments, the smart gas indoor device parameter management sub-platform 131 may be configured to obtain the change in water temperature from a temperature sensor, which may be disposed in a water storage device of the hot water supply device.

In some embodiments, the smart gas indoor device parameter management sub-platform 131 may be configured to obtain a time for obtaining the water valve adjustment history record based on a condition of a transmission signal. When the condition of the transmission signal is good, the water valve adjustment history record may be obtained immediately, and when the condition of the transmission signal is not good, the acquisition of the transmission signal may be delayed until the condition of the transmission signal is good.

In 220, determining a target temperature data table for the industrial user based on the water valve adjustment history record.

The target temperature data table is a data table that includes data related to a target temperature, which is a temperature of the hot water required by the industrial user. The hot water required by the industrial user refers to hot water in the water storage device. In some embodiments, the target temperature data table may include at least one water valve scale and at least one target temperature range corresponding to the at least one water valve scale. Since the industrial gas flow directly affects the temperature of the water in the storage device of the hot water supply device, and a temperature of water at an outlet of the hot water supply device may vary due to a pipeline insulation performance, it may be assumed that the target temperature range is a temperature range of the water in the water storage device.

In some embodiments, the smart gas indoor device parameter management sub-platform 131 may determine the target temperature range in various ways. For example, the smart gas indoor device parameter management sub-platform 131 may statistically analyze, for each water valve scale in the water valve adjustment history record, a plurality of water temperatures corresponding to the water valve scale and determine a temperature range that covers the plurality of water temperatures corresponding to the water valve scale as the target temperature range corresponding to the water valve scale. For example, for a water valve scale, temperatures of the water in the storage device corresponding to the water valve scale in the water valve adjustment history record include 37.3° C., 37.6° C., 38.6° C., and 39.5° C., then the target temperature range corresponding to the water valve scale is determined to be 37.3° C. to 39.5° C. More descriptions regarding the determination of the target temperature range may be found in FIG. 4 and the related descriptions thereof.

In some embodiments, the target temperature data table may include a plurality of water valve scales and a plurality of target temperature ranges corresponding to the plurality of water valve scales. In some embodiments, after determining the target temperature data table, the smart gas indoor device parameter management sub-platform 131 may send the target temperature data table to the smart gas object platform 150 of the corresponding industrial user.

Figure 3:
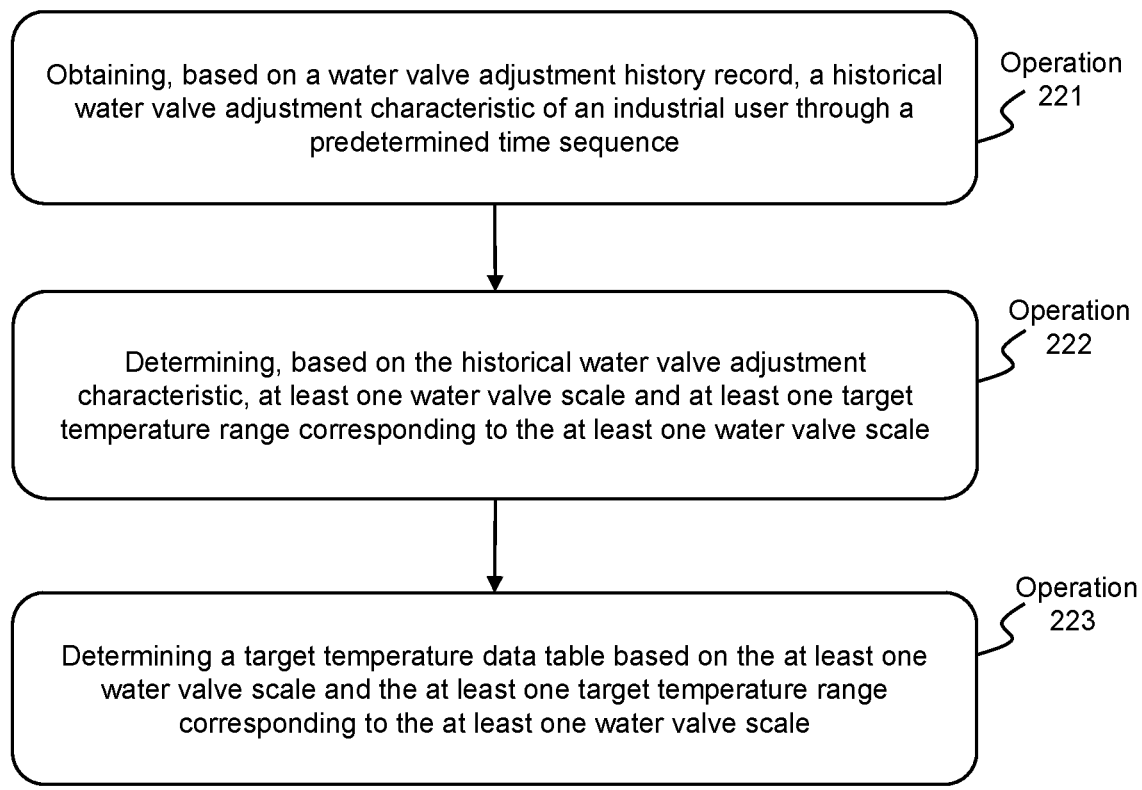
FIG. 3 is a flowchart of an exemplary process for determining a target temperature data table according to some embodiments of the present disclosure.

More descriptions regarding the determination of the target temperature data table may be found in FIG. 3 and the related descriptions thereof.

In 230, obtaining current water valve data of the hot water supply device in response to determining that the industrial user uses the hot water supply device.

The current water valve data refers to data related to adjustments of the water valve during current use of the hot water supply device by the industrial user, and in some embodiments, the current water valve data may include an adjustment rate, an adjustment direction, and a final water valve scale during a water valve adjustment process. The adjustment direction may be single-directional or multi-directional. For example, in a process of repeated fine-tuning, the adjustment direction may be multi-directional.

In some embodiments, the current water valve data may be obtained by the rotary encoder of the smart gas object sub-platform 150 and stored in the smart gas data center 133. More descriptions regarding the rotary encoder may be found in operation 210 and the related descriptions thereof.

In some embodiments, the smart gas indoor device object sub-platform 151 may determine that the industrial user uses the hot water supply device from a detection device (e.g., a gas flow meter) installed at a gas supply device of the industrial user. For example, if the gas flow meter detects a change in the industrial gas flow (e.g., a change in the industrial gas flow from 0 to a value not equal to 0, or an increase in the gas flow to a level exceeding a preset gas flow threshold), it may be determined that the industrial user uses the hot water supply device. In response to determining that the industrial user uses the hot water supply device, the smart gas indoor device parameter management sub-platform 131 may obtain the current water valve data of the hot water supply device based on the smart gas data center 133.

In 240, determining a gas flow parameter based on the current water valve data and the target temperature data table.

The gas flow parameter is data that is used to perform gradient adjustments on the industrial gas flow. In some embodiments, the gas flow parameter may include an adjustment sequence for the industrial gas flow, wherein the adjustment sequence may include a plurality of gas flow gradients and a duration of each of the plurality of gas flow gradients. The plurality of gas flow gradients correspond to different industrial gas flows sorted in a numerical order. In some embodiments, the adjustment sequence may include two phases, namely, a temperature rise gradient and a temperature retention gradient. The temperature rise gradient may include an industrial gas flow and a duration of the industrial gas flow during the phase of temperature rise. The temperature retention gradient may include a temperature retention gas flow and a duration of the temperature retention gas flow during the phase of temperature retention after the phase of temperature rise is completed. In some embodiments, the temperature retention gradient may include a plurality of gradients, and the temperature retention gas flow may be successively decreased following the plurality of gradients to avoid a temperature continuously rising beyond the target temperature range. Then, the temperature retention gas flow may be successively increased following the plurality of gradients to avoid a decrease in the increased temperature, and the decreasing and increasing processes may be repeated to achieve temperature retention.

In some embodiments, the smart gas pipeline network device parameter management sub-platform 132 may determine the gas flow parameter in various ways. For example, the smart gas pipeline network device parameter management sub-platform 132 may determine a corresponding target temperature range in the target temperature data table based on the current water valve data stored in the smart gas data center 133. Then the smart gas pipeline network device parameter management sub-platform 132 may determine, by querying a preset table, a duration required to heat water to a median value of the target temperature range based on a maximum industrial gas flow and an industrial gas flow required to keep the water temperature within the target temperature range during a process of gradually adding cold water. Heating the water based on the maximum industrial gas flow is used to raise the water temperature as quickly as possible, and the duration required to heat the water to the median value of the target temperature range may be designated as the duration of the gas flow during the phase of temperature rise.

In some embodiments, the preset table may be set in advance based on prior knowledge and historical experience. For example, a calorific value of gas and a heat transfer efficiency of the hot water supply device may be obtained based on the prior knowledge and historical experience. Based on the calorific value of gas and the heat transfer efficiency of the hot water supply device, durations required to heat different volumes of water using different industrial gas flows may be determined. In addition, a duration required for the water temperature to drop to a minimum value of the target temperature range may be obtained based on a rate at which the water temperature decreases, and the temperature retention gradient in the phase of temperature retention may be set based on the duration, thereby constructing the preset table. The heat transfer efficiency is an efficiency of transferring heat generated by gas combustion to water.

Figure 6:
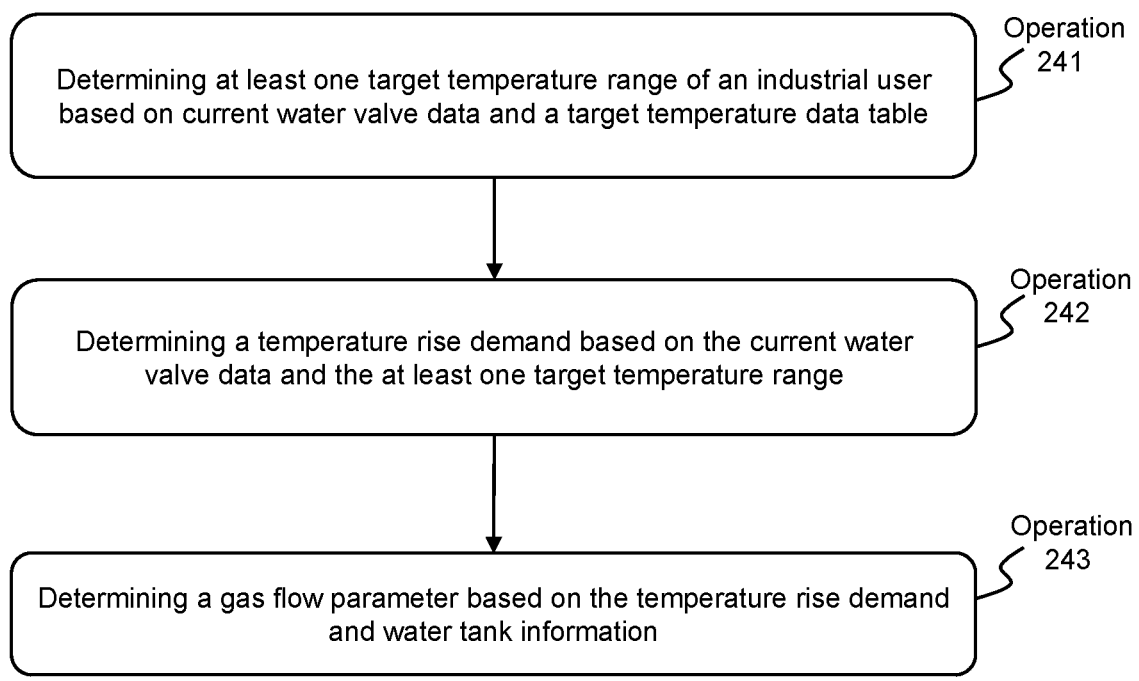
FIG. 6 is a flowchart of an exemplary process for determining a gas flow parameter according to some embodiments of the present disclosure.
Figure 7:
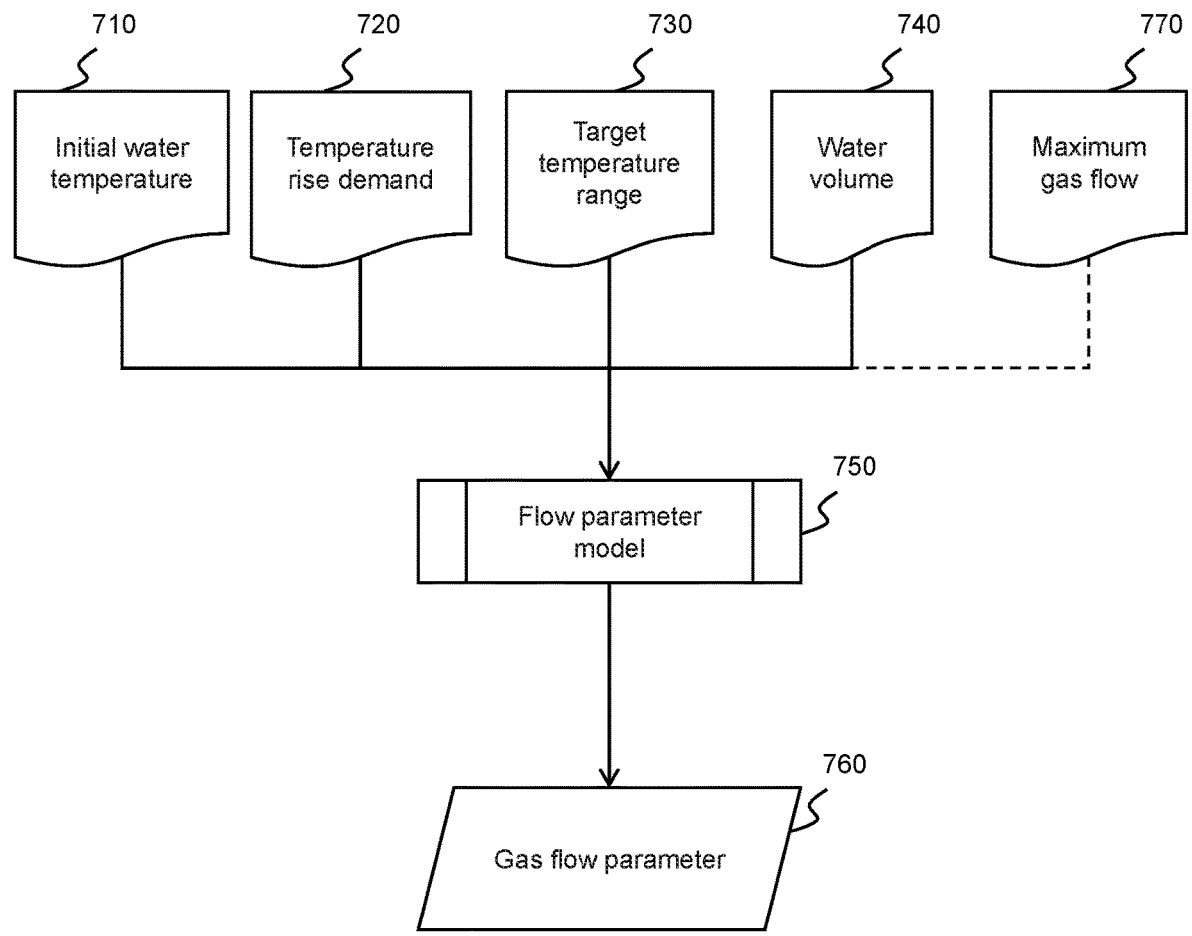
FIG. 7 is a schematic diagram of a flow parameter model according to some embodiments of the present disclosure.

More descriptions regarding the determination of the gas flow parameter may be found in FIGS. 6 and 7 and the related descriptions thereof.

In some embodiments, the smart gas pipeline network device object sub-platform 152 may adjust the gas flow based on the gas flow parameter.

In some embodiments, the smart gas pipeline network device parameter management sub-platform 132 may send the gas flow parameter to the smart gas object platform 150 via the smart gas sensing network platform 140, and the smart gas pipeline network device object sub-platform 152 may adjust the industrial gas flow.

In some embodiments of the present disclosure, based on the water valve adjustment history record and the current water valve data, the gas flow parameter is determined and the gas flow is adjusted, so that smart control of the industrial gas flow for the industrial user can be achieved, thereby meeting the industrial user's needs while minimizing energy waste as much as possible.

FIG. 3 is a flowchart of an exemplary process for determining a target temperature data table according to some embodiments of the present disclosure. As shown in FIG. 3, process 220 includes the following operations 221-223.

In 221, obtaining, based on the water valve adjustment history record, a historical water valve adjustment characteristic of the industrial user through a predetermined time sequence.

The predetermined time sequence is a sequence consisting of time points at which the historical water valve adjustment characteristic is extracted. In some embodiments, the predetermined time sequence may be set in advance.

In some embodiments, the predetermined time sequence may include a time sequence that includes time points corresponding to a current season. For example, if the current season is summer, the predetermined time sequence may include a time sequence including time points corresponding to all summer seasons in historical data (e.g., a time sequence of time points corresponding to the summer in the year of 2021, a time sequence of time points corresponding to the summer in the year of 2022, etc.).

In some embodiments, the predetermined time sequence may be determined based on seasonal information and gas consumption information of the industrial user. Seasonal variations may affect an actual outlet water temperature. By setting the predetermined time sequence based on the seasonal information and analyzing demands for water temperature in different seasons based on the water valve adjustment historical record, demands for gas heating by the industrial user in different seasons can be differentiated. Since a period of high gas consumption can be considered as a period of large-scale production in a factory, with sufficient water valve adjustment data, setting the predetermined time sequence based on the gas consumption information of the industrial user can ensure an adequate and representative amount of historical data within the predetermined time sequence, ensuring an accuracy and a reliability of subsequently determined target temperature data.

By way of example, the water valve adjustment history record may be initially categorized based on the seasonal information, and then based on the gas consumption information of the industrial user, time points in time periods with relatively high gas consumption in each season may be further selected and determined as the predetermined time sequence.

The historical water valve adjustment characteristic refers to data obtained in relation to water valve adjustments based on the time points in the predetermined time sequence. In some embodiments, the historical water valve adjustment characteristic may include the time points in the predetermined time sequence, a count of the water valve adjustments made by the industrial user each time the industrial user uses the hot water supply device, an adjustment direction, an adjustment amplitude, water temperatures before and after the water valve adjustments, a time interval between two adjacent water valve adjustments, etc. Understandably, due to a distance between a location where the water is heated and a location where the water is used in industrial water supply, there may be varying degrees of heat loss during transmission of the water, and the industrial user, after performing a water valve adjustment, may not be able to obtain a desired water temperature, so the industrial user may repeatedly fine-tune the water valve each time when using the hot water supply device to obtain the desired water temperature. In some embodiments, the historical water valve adjustment characteristic may be obtained from the smart gas data center 133.

In 222, determining, based on the historical water valve adjustment characteristic, the at least one water valve scale and the at least one target temperature range corresponding to the at least one water valve scale.

In some embodiments, the smart gas indoor device parameter management sub-platform 131 may statistically analyze a correspondence between the water valve scale and the water temperature in the water valve adjustment history record obtained from multiple uses of the hot water supply device, and one water valve scale may correspond to multiple temperatures.

In some embodiments, the smart gas indoor device parameter management sub-platform 131 may determine the at least one water valve scale and the at least one target temperature range corresponding to the at least one water valve scale in various ways. For example, the smart gas indoor device parameter management sub-platform 131 may construct a to-be-matched vector based on the historical water valve characteristic, match the to-be-matched vector with reference vectors in a first predetermined vector library, and designate a reference vector with a highest similarity to the to-be-matched vector as a determined reference vector. The determined reference vector corresponds to at least one water valve scale and at least one target temperature range corresponding to the at least one water valve scale, which are determined as the at least one water valve scale and the at least one target temperature range corresponding to the at least one water valve scale for the to-be-matched vector.

The first predetermined vector library may be constructed based on historical data. In some embodiments, the first predetermined vector library may include a plurality of reference vectors constructed based on a plurality of historical water valve adjustment characteristics, as well as at least one water valve scale and at least one target temperature range corresponding to the at least one water valve scale for each of the plurality of reference vectors.

In some embodiments, the smart gas indoor device parameter management sub-platform 131 may determine the at least one water valve scale and the at least one target temperature range corresponding to the at least one water valve scale through a temperature determination model based on the historical water valve adjustment characteristic.

The temperature determination model refers to a model for determining a target temperature range corresponding to a water valve scale, and in some embodiments, the temperature determination model may be a machine learning model. For example, the temperature determination model may include any one of a convolutional neural network (CNN) model, a neural network (NN) model, other customized model structures, or a combination thereof.

Figure 4:
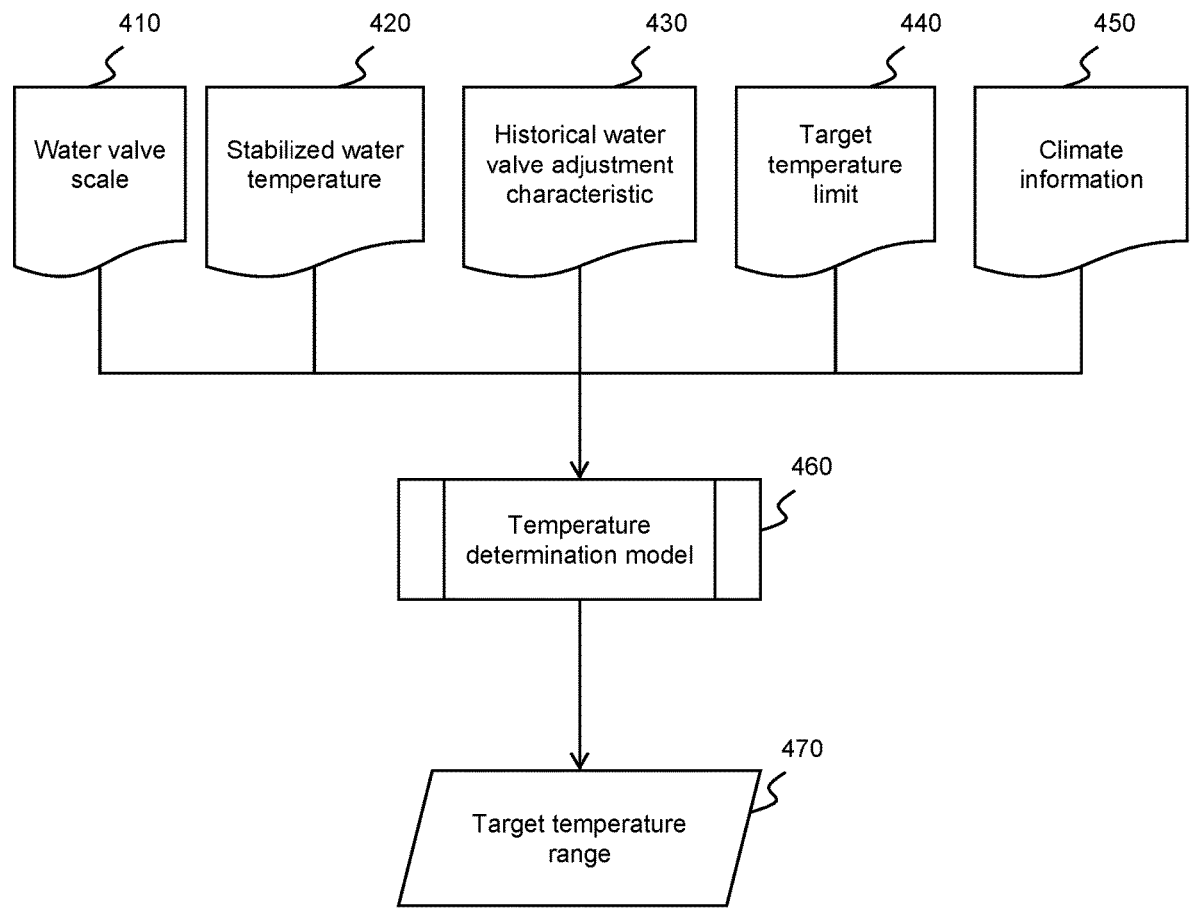
FIG. 4 is a schematic diagram of a temperature determination model according to some embodiments of the present disclosure.

FIG. 4 is a schematic diagram of a temperature determination model according to some embodiments of the present disclosure.

In some embodiments, as shown in FIG. 4, an input of a temperature determination model 460 may include a water valve scale 410, a plurality of stabilized water temperatures 420, a plurality of historical water valve adjustment characteristics 430, a target temperature limit 440, and climate information 450, and an output of the temperature determination model 460 may include a target temperature range 470 corresponding to the water valve scale.

The plurality of stabilized water temperatures 420 refer to a plurality of stabilized water temperatures corresponding to the water valve scale. An industrial user who uses a hot water supply device multiple times may adjust a same water valve scale each time but result in different output temperatures. Therefore, in a record of multiple uses of the hot water supply device, the same water valve scale may correspond to a plurality of water temperatures. Thus, each time a water valve is adjusted to the water valve scale, a plurality of final water temperatures corresponding to the water valve scale may be determined as the plurality of stabilized water temperatures 420.

The plurality of historical water valve adjustment characteristics 430 refer to a plurality of historical water valve adjustment characteristics corresponding to the plurality of stabilized water temperatures 420. More descriptions regarding the historical water valve adjustment characteristic 430 may be found in operation 221 and the related descriptions. In some embodiments, when the industrial user adjusts the water valve, the plurality of historical water valve adjustment characteristics corresponding to the plurality of stabilized water temperatures 420 may reflect a demand of the industrial user for water temperature. For example, when the industrial user adjusts the water valve towards a direction of lowering the water temperature and ultimately stops at a certain water valve scale, it indicates that the industrial user tends to accept a relatively low temperature.

In some embodiments, the water valve scale 410, the stabilized water temperature 420, and the historical water valve adjustment characteristic 430 have a one-to-one corresponding relationship.

The target temperature limit 440 refers to a maximum value of a span of the target temperature range, i.e., a difference between two endpoint values of the target temperature range. The target temperature limit 440 may be used to exclude temperatures that are excessively high or excessively low. For example, when the industrial user performs a water valve adjustment, a temperature may be excessively high but difficult to adjust. In this case, the excessively high temperature may not be used as the input of the temperature determination model 460 and needs to be excluded. By using the target temperature limit, the temperatures that are excessively high or excessively low can be excluded from the target temperature range, thereby improving an accuracy of the temperature determination model 460.

In some embodiments, the target temperature range 470 corresponding to the water valve scale corresponds to the target temperature limit. For example, if the target temperature limit is 2° C., the target temperature range corresponding to the water valve scale output by the temperature determination model 460 is 68.7° C. to 70.7° C. More descriptions regarding obtaining the target temperature limit may be found in the following related descriptions.

The climate information 450 is used to characterize current climate, including season, environmental temperature, environmental humidity, etc.

In some embodiments, the smart gas indoor device parameter management sub-platform 131 may train the temperature determination model based on a large number of first training samples with first labels. The first training sample may include a sample water valve scale, a sample stabilized water temperature, a sample historical water valve adjustment characteristic, a sample target temperature limit, and sample climate information, and the first label of the first training sample may include a sample water valve scale corresponding to an actual target temperature range. In some embodiments, the first training samples may be obtained based on historical data.

In some embodiments, the smart gas indoor device parameter management sub-platform 131 may take a water temperature range of an actual water temperature corresponding to the first training sample, on which the industrial user does not carry out a secondary adjustment, as the first label. The industrial user does not carry out the secondary adjustment means that the industrial user does not make the secondary adjustment of the water valve after an initial adjustment of the water valve, which indicates that the water temperature range corresponding to a water valve scale that the industrial user initially adjusts to is in accordance with requirements of the industrial user. By way of example, for a first training sample, the industrial user does not perform secondary adjustments for water temperatures 68.7° C., 69.1° C., 69.3° C., 69.9° C., and 70.7° C. according to historical data, but performs a secondary adjustment for a water temperature of 71.3° C., then the first label corresponding to the first training sample is a water temperature range of 68.7° C. to 70.7° C.

In some embodiments of the present disclosure, the target temperature range corresponding to the water valve scale can be determined more quickly and accurately by using the temperature determination model based on the historical water valve adjustment characteristic.

In some embodiments, the smart gas indoor device parameter management sub-platform 131 may merge the at least one target temperature range in response to determining that an overlap ratio of the at least one target temperature range corresponding to the at least one water valve scale exceeds an overlap threshold.

The overlap ratio refers to a ratio of an overlapping portion between the at least one target temperature range corresponding to the at least one water valve scale to an entire temperature range. For example, water valve scale A corresponds to a target temperature range of 35° C. to 38° C., water valve scale B corresponds to a target temperature range of 35.2° C. to 38.2° C., and there is an overlap of 2.8° C. between the two target temperature ranges, namely, 35.2° C. to 38° C. is the overlapping portion, then the overlap ratio is 2.8/3.

The overlap threshold is a threshold for determining whether the at least one target temperature ranges corresponding to the at least one water valve scale may be merged, and when the overlap ratio of the target temperature ranges corresponding to the at least one water valve scale exceeds the overlap threshold, it indicates that the at least one target temperature ranges corresponding to the at least one water valve scale may be merged. In some embodiments, the overlap threshold may be pre-set based on historical experience.

In some embodiments, each time the industrial user uses the hot water supply device, the target temperature ranges in a same process are similar. However, the water valve scale adjusted by the industrial user each time may not be precisely determined to a specific position. Therefore, the water valve scale may also include a water valve scale range. Water valve scales within the water valve scale range may be regarded as a same water valve scale, and the water valve scales within the water valve scale range all correspond to a same target temperature range.

In some embodiments, the smart gas indoor device parameter management sub-platform 131 may determine an overlapping portion between a plurality of target temperature ranges corresponding to a plurality of water valve scales as a merged target temperature range, and the plurality of water valve scales correspond to the merged target temperature range. For example, water valve scale 1 corresponds to a target temperature range of 35° C. to 37° C., water valve scale 2 corresponds to a target temperature range of 34.9° C. to 36.9° C., water valve scale 3 corresponds to a target temperature range of 35.1° C. to 37.1° C., then the overlap portion between target temperature ranges corresponding to the three water valve scales is 35.1° C. to 36.9° C., and the merged target temperature range is 35.1° C. to 36.9° C.

In some embodiments of the present disclosure, by merging the at least one target temperature range, it is possible to determine the target temperature range that still meets the requirements of the industrial user when adjusting the water valve scale imprecisely.

In some embodiments, the smart gas indoor device parameter management sub-platform 131 may determine the target temperature limit based on a water valve adjustment rate and a water valve adjustment amplitude of the industrial user.

In some embodiments, the smart gas indoor device parameter management sub-platform 131 may, on the basis of an original preset target temperature limit, further adjust the target temperature limit based on the water valve adjustment rate and the water valve adjustment amplitude. For example, if the water valve adjustment rate of the industrial user is slow and the water valve adjustment amplitude is small, it indicates a relatively precise target temperature of the industrial user. An excessively large target temperature limit may lead to excessively high or excessively low temperatures, in this case, the preset target temperature limit may be reduced to ensure that the water temperature reaches the target temperature of the industrial user.

In some embodiments of the present disclosure, a precision degree of an adjustment of the target temperature by the industrial user may be determined based on the water valve adjustment rate and the water valve adjustment amplitude, and the target temperature limit may be further adjusted based on the precision degree to avoid situations where the water temperature exceeds or fails to reach the target temperature of the industrial user.

In 223, determining the target temperature data table based on the at least one water valve scale and the at least one target temperature range corresponding to the at least one water valve scale.

In some embodiments, the smart gas indoor device parameter management sub-platform 131 may construct the target temperature data table by combining the at least one water valve scale and the at least one target temperature range corresponding to the at least one water valve scale.

In some embodiments, the smart gas indoor device parameter management sub-platform 131 may dynamically update the at least one target temperature range corresponding to the at least one water valve scale in the target temperature data table based on the water valve adjustment history record.

Figure 5:
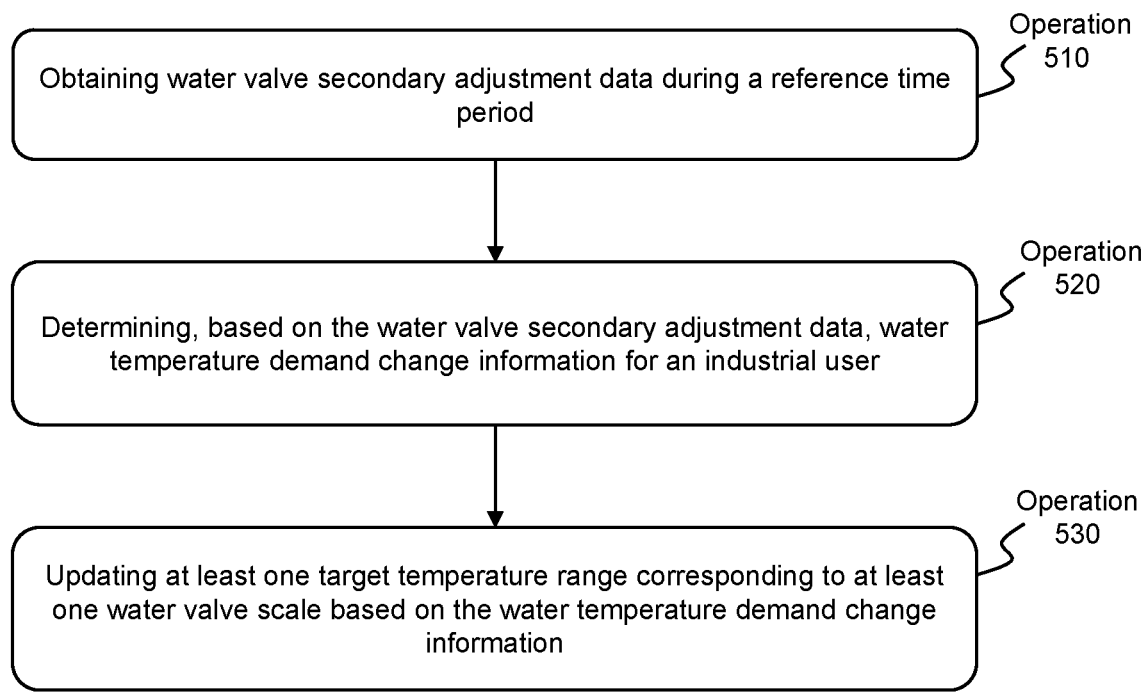
FIG. 5 is a flowchart of an exemplary process for dynamically updating a target temperature range according to some embodiments of the present disclosure.

FIG. 5 is a flowchart of an exemplary process for dynamically updating a target temperature range according to some embodiments of the present disclosure. As shown in FIG. 5, process 500 includes the following operations 510-530.

In 510, obtaining water valve secondary adjustment data during a reference time period.

The reference time period refers to a time period during which an industrial user may experience a change in water temperature demands.

In some embodiments, the reference time period may include a time period in which a change in water valve adjustment history records is greater than a first threshold and a change in gas consumption of the industrial user is less than a second threshold. The change in the gas consumption of the industrial user may characterize a change in gas consumption of the industrial user that occurs in historical data.

In some embodiments, the first threshold and the second threshold may be pre-set based on historical experience.

In some embodiments, when the change in the water valve adjustment history records is greater than the first threshold and the change in the gas consumption of the industrial user is less than the second threshold, it indicates that in situations where a production scale changes relatively little, a frequency of water valve adjustment by the industrial user increases, and the water temperature demands of the industrial user may change. In such cases, the target temperature data table may be updated.

In some embodiments of the present disclosure, the time period in which the change in the water valve adjustment history records is greater than the first threshold and the change in the gas consumption of the industrial user is less than the second threshold may be determined as the reference time period. In this way, the time period in which the change in the water temperature demands of the industrial user is more likely to take place is determined as the reference time period, which is conducive to obtaining more representative water valve secondary adjustment data, and thus more accurately determining water temperature demand change information for the industrial user.

The water valve secondary adjustment data refers to data of a secondary adjustment of a water valve performed by the industrial user based on a water temperature after an initial adjustment of the water valve is performed.

In some embodiments, the smart gas indoor device parameter management sub-platform 131 may obtain the water valve secondary adjustment data from the water valve adjustment history record.

In 520, determining, based on the water valve secondary adjustment data, water temperature demand change information for the industrial user.

In some embodiments, after the industrial user performs the initial adjustment of the water valve, the smart gas indoor device parameter management sub-platform 131 may determine a gas flow parameter based on the target temperature data table, thereby adjusting the water temperature to the target temperature range. However, if the industrial user performs the secondary adjustment of the water valve, it means that the water temperature does not meet a demand. Thus, the water temperature demand change information may be determined based on the water valve secondary adjustment data.

The water temperature demand change information refers to information related to the change in the water temperature demands. In some embodiments, the water temperature demand change information may include a direction of the change in the water temperature demands and a magnitude of the change in the water temperature demands. The direction of the change in the water temperature demands may include a demand for a higher temperature or a demand for a lower temperature. For example, seasonal changes may cause a same water valve scale to correspond to different actual water temperatures. In this case, the water temperature may be stabilized based on the water temperature demand change information.

In some embodiments, the smart gas indoor device parameter management sub-platform may determine, based on an adjustment direction and an average adjustment amplitude in the water valve secondary adjustment data, a temperature change amplitude corresponding to the average adjustment amplitude, thereby determining the water temperature demand change information.

For example, the smart gas indoor device parameter management sub-platform may determine an amount of cold water added corresponding to the secondary adjustment through calculation based on a water temperature before the secondary adjustment of the water valve and a magnitude of the secondary adjustment, and determine a water temperature after the addition of the cold water, thereby determining the temperature change amplitude. The temperature before the secondary adjustment and the adjustment amplitude may have a corresponding relationship with the amount of cold water added, which may be obtained through experimentation. Due to delays, water valve errors, or the like, it is difficult to accurately achieve an expected temperature during the secondary adjustment of the water valve, so determining the temperature change amplitude through calculation is a more accurate approach.

In 530, updating the at least one target temperature range corresponding to the at least one water valve scale based on the water temperature demand change information.

In some embodiments, the smart gas indoor device parameter management sub-platform 131 may update, based on the water temperature demand change information, the at least one target temperature range corresponding to the at least one water valve scale to a target temperature range after the water temperature demand changes. For example, if the target temperature range before updating is 35.7° C. to 38.3° C., and the water temperature demand change information includes a demand to increase the water temperature by 2° C.; then the updated target temperature range is 37.7° C. to 40.3° C.

In some embodiments of the present disclosure, the change in the water temperature demands of the industrial user may be determined based on the secondary adjustment of the water valve by the industrial user, so that the target temperature range can be adaptively updated, achieving smart temperature control and promptly meeting the changing water temperature demands of the industrial user.

FIG. 6 is a flowchart of an exemplary process for determining a gas flow parameter according to some embodiments of the present disclosure. As shown in FIG. 6, process 240 includes the following operations 241-243.

In 241, determining a target temperature range of the industrial user based on the current water valve data and the target temperature data table.

In some embodiments, the smart gas pipeline network device parameter management sub-platform 132 may determine, based on the current water valve data, the target temperature range of the industrial user by querying the target temperature data table. More descriptions regarding the target temperature data table may be found in FIGS. 2 and 3 and the related descriptions thereof.

In 242, determining a temperature rise demand based on the current water valve data and the target temperature range of the industrial user.

The temperature rise demand refers to a demand to increase a current water temperature. In some embodiments, the temperature rise demand may include a temperature rise target and a temperature rise strategy. The temperature rise target refers to a target to raise the current water temperature to a maximum value, a minimum value, or other values within the target temperature range. The temperature rise strategy may include rapidly raising the current water temperature to a temperature slightly higher than the temperature rise target and then lowering the water temperature, or rapidly raising the current water temperature to a temperature slightly lower than the temperature rise target and then gradually reaching the temperature rise target.

In some embodiments, the smart gas pipeline network device parameter management sub-platform 132 may determine the temperature rise demand in a variety of ways. For example, the smart gas pipeline network device parameter management sub-platform 132 may designate a median value of the target temperature range as the temperature rise target, and then determine the temperature rise strategy based on an adjustment direction of a water valve in the current water valve data. For example, in the current water valve data, if the industrial user first raises the current water temperature and then lowers the current water temperature, the temperature rise strategy may be rapidly raising the current water temperature to a temperature slightly higher than the temperature rise target and then lowering the water temperature. Conversely, if the user first lowers the current water temperature and then gradually raises the water temperature, the strategy may be rapidly raising the current water temperature to a temperature slightly lower than the temperature rise target and then gradually reaching the temperature rise target.

In some embodiments, the smart gas pipeline network device parameter management sub-platform 132 may evaluate the temperature rise demand based on the at least one target temperature range and/or a target temperature limit, and determines the temperature rise demand based on a water temperature adjustment accuracy requirement corresponding to the current water valve data.

The water temperature adjustment accuracy requirement corresponding to the current water valve data refers to a requirement of the industrial user on an accuracy of adjusting the water temperature at a current water valve scale. For example, the water temperature adjustment accuracy requirement corresponding to the current water valve data may include a requirement that the water temperature may be relatively high but not relatively low, as well as an allowable magnitude of a water temperature fluctuation at the current water valve scale. Different processes in different industries involve different water temperature adjustment accuracy requirements, and since different target temperature ranges may correspond to different processes in different industries, the water temperature corresponding to the current water valve data may be evaluated based on the target temperature range. The water temperature adjustment accuracy requirement corresponding to the current water valve data may be evaluate based on the target temperature range.

In some embodiments, the smart gas pipeline network device parameter management sub-platform 132 may rank median values of target temperature ranges corresponding to a plurality of water valve scales of all industrial users in a same industry from high to low, and determine whether the median values of the target temperature ranges corresponding to the plurality of water valve scales of the industrial users are at a top rank. If the median values of the target temperature ranges corresponding to the plurality of water valve scales of the industrial users are at the top rank, then the water temperature may be relatively high in the water temperature adjustment accuracy requirement. Conversely, if the median values of the target temperature ranges corresponding to the plurality of water valve scales of the industrial users are not at the top rank, then the water temperature may be relatively low in the water temperature adjustment accuracy requirement. Being at the top rank may include at the top 50% or top 40% of the rank, or the like.

In some embodiments, the smart gas pipeline network device parameter management sub-platform 132 may evaluate the water temperature adjustment accuracy requirement corresponding to the current water valve data based on the target temperature limit. Understandably, the smaller the target temperature limit value is, the smaller a difference between two endpoint values of the target temperature range is, the more accurate the target temperature range is, and thus the higher the water temperature adjustment accuracy requirement is. In some embodiments, the smart gas pipeline network device parameter management sub-platform 132 may evaluate the water temperature adjustment accuracy based on the target temperature range and the target temperature limit. Taking the above example for illustration, the water temperature adjustment accuracy may be firstly evaluated by ranking the median values of the target temperature ranges corresponding to the plurality of water valve scales of the industrial users in the same industry, and then the water temperature adjustment accuracy may be further evaluated based on a magnitude of the target temperature limit.

In some embodiments, the smart gas pipeline network device parameter management sub-platform 132 may determine the allowable magnitude of the water temperature fluctuation based on an adjustment rate and an adjustment amplitude of the water valve in the current water valve scale data. The slower the adjustment rate and the smaller the adjustment amplitude, the smaller the allowable magnitude of the water temperature fluctuation.

In some embodiments, in response to determining that an allowable water temperature is relatively high under the water temperature adjustment accuracy requirement, the smart gas pipeline network device parameter management sub-platform 132 may set the temperature rise target to be a little bit lower than the median value of the target temperature range, and determine the temperature rise strategy to be rapidly raising the current water temperature to a temperature slightly lower than the temperature rise target and then gradually reaching the temperature rise target. In response to determining that the allowable water temperature is relatively low under the water temperature adjustment accuracy requirement, the smart gas device management platform 130 may set the temperature rise target to be a little bit higher than the median value of the target temperature range and determine the temperature rise strategy to be rapidly raising the current water temperature to a temperature slightly higher than the temperature rise target and then lowering the water temperature. Whether the allowable water temperature is relatively high or relatively low may be determined based on the allowable magnitude of the water temperature fluctuation. For example, if the water temperature adjustment accuracy requirement is relatively high and the allowable magnitude of the water temperature fluctuation is 0.5° C., the temperature rise demand may be rapidly raising the current water temperature by to 0.5° C. higher than the median of the target temperature range and then lowering the temperature.

In some embodiments of the present disclosure, determining the temperature rise demand based on the water temperature adjustment accuracy requirement ensures that suitable temperature rise demands can be determined when using hot water supply devices in different processes of different industries.

In 243, determining the gas flow parameter based on the temperature rise demand and water tank information.

In some embodiments, the smart gas service platform may determine the gas flow parameter in a variety of feasible ways. For example, the smart gas service platform may construct a preset correspondence table based on the temperature rise demand, the tank information, and the gas flow parameter, and determine the gas flow parameter by looking up the preset correspondence table.

The water tank information refers to information about water in a water storage device of the hot water supply device, including but not limited to an initial water temperature of the water in the water storage device, a water volume of the water in the water storage device, or the like.

In some embodiments, the smart gas pipeline network device parameter management sub-platform 132 may determine the gas flow parameter by using a flow parameter model based on the tank information, the temperature rise demand, and the target temperature range.

The flow parameter model refers to a model for determining the gas flow parameter, and in some embodiments, the flow parameter model may be a machine learning model. For example, the flow parameter model may include any one of a convolutional neural network (CNN) model, a neural network (NN) model, or other customized model structures, or a combination thereof.

FIG. 7 is a schematic diagram of a flow parameter model according to some embodiments of the present disclosure.

In some embodiments, as shown in FIG. 7, an input of the flow parameter model 750 may include an initial water temperature 710, a temperature rise demand 720, a target temperature range 730, and a water volume 740, and an output of the flow parameter model 750 may include a gas flow parameter 760.

In some embodiments, the smart gas pipeline network device parameter management sub-platform 132 may train the flow parameter model based on a large number of second training samples with second labels. The second training sample may include a sample initial water temperature, a sample temperature rise demand, a sample target temperature range, and a sample water volume, and the second label may include an actual gas flow parameter corresponding to the second training sample.

In some embodiments, the smart gas pipeline network device parameter management sub-platform 132 may select an industrial user who is relatively satisfied with a water temperature of a hot water supply device, determine the second training samples based on a water valve adjustment history record of the industrial user, and determine the actual gas flow rate parameters corresponding to the second training samples as the second labels. In some embodiments, the actual gas flow rate parameters may also be obtained through the preset correspondence table described in operation 243, and since the predetermined table is determined based on prior knowledge and historical experience, the second labels obtained through the preset correspondence table have a higher accuracy.

In some embodiments, multiple pieces of test data from an experiment used to determine the preset correspondence table may be determined as the second training samples and the second labels. For example, for two water temperatures measured at any two time points in the experiment, a first temperature measured at a preceding time point may be designated as the initial water temperature and a second temperature measured at a succeeding time point may be determined as a temperature rise target in the temperature rise demand, and a gas flow parameter corresponding to raising the first temperature to the second temperature may be determined as the second label.

In some embodiments of the present disclosure, the gas flow parameter may be determined using the flow parameter model based on the water tank information, the temperature rise demand, and the target temperature range. This allows for a rapid determination of a more reasonable gas flow parameter based on an actual water volume and an actual water temperature of water in a water tank (e.g., a water storage device) and a demand of the industrial user.

In some embodiments, as shown in FIG. 7, the input of the flow parameter model 750 may further include a maximum industrial gas flow 770.

The maximum industrial gas flow rate 770 refers to a maximum value of an industrial gas flow that may be supplied in a gas pipeline network.

In some embodiments, the smart gas pipeline network device parameter management sub-platform 132 may determine the maximum industrial gas flow based on a smart gas Internet of Things (IOT) system in conjunction with a gas load in a current gas pipeline network. Different maximum industrial gas flows result in varying durations for a heating phase, leading to different actual industrial gas flows.

In some embodiments, when the input of the flow parameter model includes the maximum industrial gas flow, the first training sample may also include a sample maximum industrial gas flow.

In some embodiments of the present disclosure, by taking into account an actual situation of the current gas pipeline network in the input of the flow parameter model, a more accurate gas flow parameter can be output by the flow parameter model.

In some embodiments of the present disclosure, determining the gas flow parameter based on the temperature rise demand and the water tank information can achieve smart determination of the gas flow parameter based on an actual situation of the water tank and temperature rise demands of different processes in different industries, enabling smart control of the industrial gas flow to meet demands of different industrial users while avoiding energy waste.

The basic concepts have been described above, and it is apparent that to a person skilled in the art, the above detailed disclosure is intended as an example only and does not constitute a limitation of the present disclosure. Although not expressly stated herein, various modifications, improvements, and amendments may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment," "one embodiment," and/or "some embodiments" are meant to refer to a certain feature, structure, or characteristic associated with at least one embodiment of the present disclosure. Accordingly, it should be emphasized and noted that "an embodiment," "one embodiment," or "an alternative embodiment" mentioned two or more times in different places in the present disclosure do not necessarily refer to the same embodiment. Furthermore, certain features, structures, or characteristics in one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. Although a number of embodiments of the present disclosure currently considered useful are discussed in the above disclosure by way of various examples, it should be understood that such details serve illustrative purposes only, and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the present disclosure, and thus aid in the understanding of one or more embodiments of the present disclosure, the preceding description of embodiments of the present disclosure sometimes combines multiple features into a single embodiment, accompanying drawings, or description thereof. However, this way of disclosure does not imply that the subject matter of the present disclosure requires more features than those mentioned in the claims. Rather, claimed subject matter may lie in less than all features of a single foregoing disclosed embodiment.

In some embodiments, numeric values describing the composition and quantity of attributes are used in the description. It should be understood that such numeric values used for describing embodiments may be modified with qualifying terms such as "about," "approximately," or "generally." Unless otherwise stated, "about," "approximately," or "generally" indicates that a variation of ±20% is permitted in the described numbers. Accordingly, in some embodiments, the numerical parameters used in the disclosure and claims are approximations, which may change depending on the desired characteristics of the individual embodiment. In some embodiments, the numerical parameters take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

Finally, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A method for automatic control of an industrial gas flow, wherein the method is executed by a smart gas device management platform of a smart gas Internet of Things (IoT) system, the smart gas IoT system further includes a smart gas user platform, a smart gas service platform, a smart gas sensing network platform, and a smart gas object platform; wherein the smart gas user platform is a platform for interacting with a user, and the smart gas user platform is configured as a terminal device;

the smart gas service platform is a platform for communicating user demand and control information;

the smart gas service platform is configured to obtain information from the smart gas device management platform and send the information to the smart gas user platform;

the smart gas device management platform is a platform that coordinates and harmonizes connections and collaborations among various platforms, aggregates all information of the smart gas IoT system, and provides perception management and control management functions for operation of the smart gas IoT system, the smart gas device management platform includes a smart gas indoor device parameter management sub-platform, a smart gas pipeline network device parameter management sub-platform, and a smart gas data center;

the smart gas sensing network platform is a platform that manages sensing communication; and the smart gas object platform is a platform for sensing information generation and controlling information execution;

the method comprising:

obtaining, by the smart gas indoor device parameter management sub-platform, a water valve adjustment history record of an industrial user who uses a hot water supply device stored in the smart gas data center;

determining, by the smart gas indoor device parameter management sub-platform, a target temperature data table for the industrial user based on the water valve adjustment history record, and sending, by the smart gas indoor device parameter management sub-platform, the target temperature data table to the smart gas object platform corresponding to the industrial user;

wherein the target temperature data table includes at least one water valve scale and at least one target temperature range corresponding to the at least one water valve scale;

obtaining, by the smart gas indoor device parameter management sub-platform, based on the water valve adjustment history record, a historical water valve adjustment characteristic of the industrial user through a predetermined time sequence, wherein the predetermined time sequence is a time sequence that includes time points corresponding to a current season, and the predetermined time sequence is determined based on seasonal information and gas consumption information of the industrial user;

determining, by the smart gas indoor device parameter management sub-platform, based on the historical water valve adjustment characteristic, the at least one water valve scale and the at least one target temperature range corresponding to the at least one water valve scale;

determining, by the smart gas indoor device parameter management sub-platform, the target temperature data table based on the at least one water valve scale and the at least one target temperature range corresponding to the at least one water valve scale;

obtaining, by the smart gas indoor device parameter management sub-platform, current water valve data of the hot water supply device through a rotary encoder of the smart gas object platform in response to determining that the industrial user uses the hot water supply device; and storing the current water valve data in the smart gas data center;

determining, by the smart gas pipeline network device parameter management sub-platform, a corresponding target temperature range in the target temperature data table based on the current water valve data stored in the smart gas data center, and determining a gas flow parameter by querying a preset table, wherein the gas flow parameter includes an adjustment sequence of the industrial gas flow; and sending, by the smart gas pipeline network device parameter management sub-platform, the gas flow parameter to the smart gas object platform via the smart gas sensing network platform, and adjusting, by the smart gas object platform, the industrial gas flow based on the gas flow parameter.

2. The method according to claim 1, further comprising:
dynamically updating the at least one target temperature range corresponding to the at least one water valve scale in the target temperature data table based on the water valve adjustment history record, wherein the dynamically updating includes:
obtaining water valve secondary adjustment data during a reference time period;
determining, based on the water valve secondary adjustment data, water temperature demand change information for the industrial user; and
updating the at least one target temperature range corresponding to the at least one water valve scale based on the water temperature demand change information.

3. The method according to claim 1, wherein the determining a gas flow parameter by querying a preset table includes:
determining a target temperature range of the industrial user based on the current water valve data and the target temperature data table;
determining a temperature rise demand based on the current water valve data and the target temperature range of the industrial user; and
determining the gas flow parameter based on the temperature rise demand and water tank information.

4. The method according to claim 3, wherein the determining a temperature rise demand based on the current water valve data and the target temperature range includes:
evaluating a water temperature adjustment accuracy requirement corresponding to the current water valve data based on the target temperature range of the industrial user and/or a target temperature limit; and
determining the temperature rise demand based on the water temperature adjustment accuracy requirement.

5. The method according to claim 3, wherein the determining the gas flow parameter based on the temperature rise demand and water tank information includes:
determining the gas flow parameter based on the water tank information, the temperature rise demand, and the target temperature range of the industrial user through a flow parameter model, wherein the flow parameter model is a machine learning model; wherein
an input of the flow parameter model includes an initial water temperature, the temperature rise demand, the target temperature range, and a water volume, and an output of the flow parameter model includes the gas flow parameter.

6. The method according to claim 5, wherein the smart gas pipeline network device parameter management sub-platform is configured to:
train the flow parameter model based on a large number of second training samples with second labels, the second training samples include a sample initial water temperature, a sample temperature rise demand, a sample target temperature range, and a sample water volume, and the second labels include actual gas flow parameters corresponding to the second training samples; and
select an industrial user who is satisfied with the water temperature of the hot water supply device, determine the second training samples based on the water valve adjustment history record of the industrial user who is satisfied with the water temperature of the hot water supply device, and determine the actual gas flow parameters corresponding to the second training samples as the second labels.

7. The method according to claim 1, wherein the smart gas user platform includes a gas user sub-platform, a government user sub-platform, and a supervisory user sub-platform;
the smart gas service platform includes a smart gas consumption service sub-platform, a smart operation service sub-platform, and a smart supervision service sub-platform;
the smart gas sensing network platform includes a smart gas indoor device sensing network sub-platform and a smart gas pipeline network device sensing network sub-platform; and
the smart gas object platform includes a smart gas indoor device object sub-platform and a smart gas pipeline network device object sub-platform;
wherein
the smart gas pipeline network device parameter management sub-platform is configured to determine the gas flow parameterh based on the current water valve data and the target temperature data table, and send the gas flow parameter to the smart gas pipeline network device object sub-platform via the smart gas pipeline network device sensing network sub-platform;
the smart gas indoor device sensing network sub-platform and the smart gas pipeline network device sensing network sub-platform are configured to obtain operation information of an indoor device and a gas pipeline network device, respectively; and
the smart gas pipeline network device object sub-platform is configured to adjust the industrial gas flow based on the gas flow parameter.

8. The method according to claim 7, wherein the water valve adjustment history record is historical data related to use of the hot water supply device by the industrial user; and the water valve adjustment history record includes a stopping scale of a water valve and an adjustment amplitude of the water valve when the water valve is adjusted by the industrial user who uses the hot water supply device for each time during a historical time period; wherein the smart gas indoor device parameter management sub-platform is configured to obtain the stopping scale of the water valve and the adjustment amplitude of the water valve from the rotary encoder of the smart gas object platform; wherein the rotary encoder is installed on the water valve, and the stopping scale of the water valve and the adjustment amplitude of the water valve are determined by reading a rotation angle of the water valve, wherein the rotary encoder is a sensor that is used to measure a rotational motion of the water valve.

9. The method according to claim 8, wherein the smart gas indoor device parameter management sub-platform is configured to obtain a time for obtaining the water valve adjustment history record based on a condition of a transmission signal.

10. The method according to claim 7, wherein the water valve adjustment history record includes a change in a water temperature when the water valve is adjusted by the industrial user who uses the hot water supply device for each time during a historical time period; wherein the smart gas indoor device parameter management sub-platform is configured to obtain the change in the water temperature from a temperature sensor, and the temperature sensor is disposed in a water storage device of the hot water supply device.

11. The method according to claim 1, wherein the smart gas indoor device object sub-platform is configured to determine that the industrial user is using the hot water supply device from a detection device installed at a gas supply device of the industrial user.

12. The method according to claim 1, wherein the determining the at least one water valve scale and the at least one target temperature range corresponding to the at least one water valve scale based on the historical water valve adjustment characteristic includes:

determining, based on the historical water valve adjustment characteristic, the at least one water valve scale and the at least one target temperature range corresponding to the at least one water valve scale through a temperature determination model, wherein the temperature determination model is a machine learning model; wherein an input of the temperature determination model includes the water valve scale, a plurality of stabilized water temperatures, a plurality of historical water valve adjustment characteristics, a target temperature limit, and climate information, and an output of the temperature determination model includes the target temperature range corresponding to the water valve scale.

13. The method according to claim 12, wherein the smart gas indoor device parameter management sub-platform is configured to train the temperature determination model based on a large number of first training samples with first labels; wherein the first training samples include a sample water valve scale, sample stabilized water temperatures, sample historical water valve adjustment characteristics, a sample target temperature limit, and sample climate information, and the first labels of the first training samples include an actual target temperature range corresponding to the sample water valve scale, and the first training samples are obtained based on historical data.

14. A smart gas Internet of Things (IoT) system for automatic control of an industrial gas flow, comprising a smart gas user platform, a smart gas service platform, a smart gas device management platform, a smart gas sensing network platform, and a smart gas object platform, wherein the smart gas user platform is a platform for interacting with a user, and the smart gas user platform is configured as a terminal device;

the smart gas service platform is a platform for communicating user demand and control information;

the smart gas service platform is configured to obtain information from the smart gas device management platform and send the information to the smart gas user platform;

the smart gas device management platform is a platform that coordinates and harmonizes connections and collaborations among various platforms, aggregates all information of the smart gas IoT system, and provides perception management and control management functions for an operation of the smart gas IoT system, the smart gas device management platform includes a smart gas indoor device parameter management sub-platform, a smart gas pipeline network device parameter management sub-platform, and a smart gas data center;

the smart gas sensing network platform is a platform that manages sensing communication, and the smart gas sensing network platform includes a smart gas indoor device sensing network sub-platform and a smart gas pipeline network device sensing network sub-platform;

the smart gas object platform is a platform for sensing information generation and controlling information execution, and the smart gas object platform includes a smart gas indoor device object sub-platform and a smart gas pipeline network device object sub-platform;

the smart gas indoor device parameter management sub-platform is configured to obtain a water valve adjustment history record of an industrial user who uses a hot water supply device, wherein the water valve adjustment history record is stored in the smart gas data center;

the smart gas indoor device parameter management sub-platform is configured to:

determine a target temperature data table for the industrial user based on the water valve adjustment history record, and send the target temperature data table to the smart gas object platform corresponding to the industrial user, wherein the target temperature data table is stored in the smart gas data center and the target temperature data table includes at least one water valve scale and at least one target temperature range corresponding to the at least one water valve scale;

obtain, based on the water valve adjustment history record, a historical water valve adjustment characteristic of the industrial user through a predetermined time sequence, wherein the predetermined time sequence is a time sequence that includes time points corresponding to a current season, and the predetermined time sequence is determined based on seasonal information and gas consumption information of the industrial user;

determine, based on the historical water valve adjustment characteristic, the at least one water valve scale and the at least one target temperature range corresponding to the at least one water valve scale; and determine the target temperature data table based on the at least one water valve scale and the at least one target temperature range corresponding to the at least one water valve scale;

the smart gas indoor device parameter management sub-platform is configured to obtain current water valve data of the hot water supply device through a rotary encoder of the smart gas object platform in response to determining that the industrial user uses the hot water supply device, and store the current water valve data is stored in the smart gas data center; and the smart gas pipeline network device parameter management sub-platform is configured to:

determine a corresponding target temperature range in the target temperature data table based on the current water valve data stored in the smart gas data center, and determine a gas flow parameter by querying a preset table, wherein the gas flow parameter includes an adjustment sequence of the industrial gas flow; and send the gas flow parameter to the smart gas pipeline network device object sub-platform via the smart gas sensing network platform;

the smart gas pipeline network device object sub-platform is configured to adjust the industrial gas flow based on the gas flow parameter.

15. The smart gas IoT system according to claim 14, wherein the smart gas indoor device parameter management sub-platform is configured to dynamically update the at least one target temperature range corresponding to the at least one water valve scale in the target temperature data table based on the water valve adjustment history record, wherein the dynamically update includes operations including:

obtaining water valve secondary adjustment data during a reference time period;

determining, based on the water valve secondary adjustment data, water temperature demand change information for the industrial user; and updating the at least one target temperature range corresponding to the at least one water valve scale based on the water temperature demand change information.

16. The smart gas IoT system according to claim 14, wherein to determine a gas flow parameter by querying a preset table, the smart gas pipeline network device parameter management sub-platform is further configured to:

determine a target temperature range of the industrial user based on the current water valve data and the target temperature data table;

determine a temperature rise demand based on the current water valve data and the target temperature range of the industrial user; and determine the gas flow parameter based on the temperature rise demand and water tank information.

17. The smart gas IoT system according to claim 16, wherein to determine the temperature rise demand based on the current water valve data and the target temperature range, the smart gas pipeline network device parameter management sub-platform is further configured to:

evaluate a water temperature adjustment accuracy requirement corresponding to the current water valve data based on the target temperature range of the industrial user or a target temperature limit; and determine the temperature rise demand based on the water temperature adjustment accuracy requirement.

* * * * *